(12) United States Patent
Shi et al.

(10) Patent No.: US 12,470,949 B2
(45) Date of Patent: Nov. 11, 2025

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Cong Shi, Guangdong (CN); Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 1018 days.

(21) Appl. No.: 17/456,696

(22) Filed: Nov. 29, 2021

(65) Prior Publication Data

US 2022/0086662 A1    Mar. 17, 2022

Related U.S. Application Data

(63) Continuation of application No. PCT/CN2019/111717, filed on Oct. 17, 2019.

(51) Int. Cl.
*H04W 72/12* (2023.01)
*H04W 24/02* (2009.01)

(52) U.S. Cl.
CPC .......... *H04W 24/02* (2013.01); *H04W 72/12* (2013.01)

(58) Field of Classification Search
CPC .............................. H04W 72/12; H04W 24/02
USPC ........................................................ 370/329
See application file for complete search history.

(56) References Cited

U.S. PATENT DOCUMENTS

| | | | |
|---|---|---|---|
| 2011/0246880 A1* | 10/2011 | Horton | G06F 9/453 |
| | | | 715/708 |
| 2014/0128122 A1 | 5/2014 | Nikiforov | |
| 2014/0301251 A1* | 10/2014 | Chen | H04W 72/541 |
| | | | 370/278 |
| 2015/0382364 A1* | 12/2015 | Sharma | H04W 72/23 |
| | | | 370/329 |

(Continued)

FOREIGN PATENT DOCUMENTS

| | | |
|---|---|---|
| CN | 102378287 A | 3/2012 |
| CN | 103580777 A | 2/2014 |

(Continued)

OTHER PUBLICATIONS

Second Office Action issued in corresponding CN Application No. 202111631710.0 dated Apr. 12, 2023. (15 pages with English translation).

(Continued)

*Primary Examiner* — Angel T Brockman
(74) *Attorney, Agent, or Firm* — PERKINS COIE LLP (57) ABSTRACT

A wireless communication method and a wireless communication device which enable a assistance information to flexibly used are provided. The method includes: transmitting an assistance information to a network device, the assistance information including at least one parameter information, and transmitting a first information to the network device, the first information configured for the network device to determine a target parameter information to be deleted, the target parameter information included in the at least one parameter information. The network device can determine, in accordance with the first information, the at least one target parameter information which is to be deleted.

9 Claims, 3 Drawing Sheets

200 transmitting an assistance information to a network device, the assistance information including at least one parameter information — S210 transmitting a first information to the network device, the first information being configured for the network device to determine a target parameter information to be deleted, the target parameter information being included in the at least one parameter information — S220

(56) References Cited

U.S. PATENT DOCUMENTS

2019/0200209 A1   6/2019   Velev et al.
2020/0280951 A1   9/2020   Tsuda et al.

FOREIGN PATENT DOCUMENTS

| | | | | |
|---|---|---|---|---|
| CN | 103581884 | A | 2/2014 | |
| CN | 103890720 | A | 6/2014 | |
| CN | 104205895 | A | 12/2014 | |
| CN | 104471990 | A | 3/2015 | |
| CN | 104584672 | A | 4/2015 | |
| CN | 108924857 | A | 11/2018 | |
| CN | 108990138 | A | 12/2018 | |
| CN | 109327883 | A | 2/2019 | |
| CN | 109565895 | A | 4/2019 | |
| CN | 109982415 | A | 7/2019 | |
| EP | 2605590 | A1 | 6/2013 | |
| EP | 2701057 | A2 * | 2/2014 | ............ G06F 13/14 |
| EP | 2876942 | A1 | 5/2015 | |
| WO | 2013053395 | A1 | 4/2013 | |
| WO | 2013140033 | A1 | 9/2013 | |
| WO | 2019096673 | A1 | 5/2019 | |

OTHER PUBLICATIONS

RP-191607, NR_Power_Saving_WID_update, dated Jun. 6, 2019.
Protocol specification 3GPP TS 36.331 V15.7.0, dated Sep. 30, 2019.
International search report issued in corresponding international application No. PCT/CN2019/111717 dated Jul. 15, 2020.
Extended European search report of the European application No. 19948935.2, issued on May 20, 2022. 10 pages.
OPPO, 3GPP TSG-RAN WG2, Meeting #107bis, R2-1912093, "UE assistance information for power saving", Oct. 14-Oct. 18, 2019. 3 pages.
Huawei et al. 3GPP TSG-RAN2, Meeting#105bis, R2-1904937, "Draft CR on coordination for overheating in MR-DC scenario", Apr. 8-Apr. 12, 2019. 7 pages.
Examination Report issued in corresponding EP application No. 19948935.2 dated Feb. 17, 2023. 9 pages.
The first office action issued in corresponding CN application No. 202111631710.0 dated Jan. 19, 2023. 22 pages with English translation.

* cited by examiner

WIRELESS COMMUNICATION METHOD AND DEVICE

CROSS-REFERENCE TO RELATED APPLICATION

This application is a continuation of International Application No. PCT/CN2019/111717 filed on Oct. 17, 2019, entitled "WIRELESS COMMUNICATION METHOD AND DEVICE", the entire disclosure of which is incorporated herein by reference.

TECHNICAL FIELD

Embodiments of this application relate to the communications field, and particularly, to a wireless communication method and a device.

BACKGROUND

In relevant technologies, in order to save power of a terminal device, the terminal device transmits its assistance information to a network device based on its demands and current states. The assistance information is used for assisting the network device to schedule or configure the terminal device.

SUMMARY

The present application provides a wireless communication method and a device, which can be conducive for a network device to use an assistance information.

In a first aspect, a wireless communication method is provided. The method includes: transmitting, by a terminal device, an assistance information to a network device, the assistance information including at least one parameter information capable of assisting the network device to schedule or configure the terminal device;
  transmitting, by the terminal device, a first information to the network device, the first information configured for the network device to determine a target parameter information to be deleted, the target parameter information included in the at least one parameter information; and after deletion of the target parameter information, causing the network device to not include the target parameter information in scheduling or configuring the terminal device.

In a second aspect, a wireless communication method is provided. The method includes: receiving, by a network device, an assistance information from a terminal device, the assistance information including at least one parameter information capable of assisting the network device to schedule or configure the terminal device;
  receiving, by the network device, a first information from a terminal device;
  determining, by the network device and in accordance with the first information, a target parameter information to be deleted, the target parameter information included in the at least one parameter information; and
  deleting, by the network device, the target parameter information.

In a third aspect, a terminal device is provided. The terminal device includes a processor, a memory and a transceiver. The transceiver is configured to: transmit an assistance information to a network device, the assistance information including at least one parameter information capable of assisting the network device to schedule or configure the terminal device; and transmit a first information to the network device, the first information configured for the network device to determine a target information to be deleted, the target parameter information included in the at least one parameter information.

In a fourth aspect, a network device is provided. The network device includes a processor, a memory and a transceiver. The transceiver is configured to receive an assistance information transmitted by a terminal device, the assistance information including at least one parameter information capable of assisting the network device to schedule or configure the terminal device, and configured to receive a first information transmitted by the terminal device; wherein the processor is configured to determine, in accordance with the first information, a target parameter information to be deleted and to delete the target parameter information, the target parameter information included in the at least one parameter information.

In a fifth aspect, a terminal device is provided. The terminal device includes a processor and a memory. The memory is configured to store a computer program, and the processor is configured to call and run the computer program stored in the memory to perform the method in the above first aspect or various implementations of the first aspect.

In a sixth aspect, a network device is provided. The network device includes a processor and a memory. The memory is configured to store a computer program, and the processor is configured to call and run the computer program stored in the memory to perform the method in the above second aspect or various implementations of the second aspect.

In a seventh aspect, a chip is provided. The chip is configured to perform the method in the above first or second aspect, or any possible implementations of the above first aspect or second aspect. Specifically, the chip includes a processor configured to call and run a computer program from a memory to enable a device mounted with the chip to perform the method in the above first or second aspect, or to perform any possible implementations of the first or second aspect.

In an eighth aspect, a computer-readable storage medium is provided. The computer program is configured to store a computer program. The computer program enables a computer to perform the method in the above first or second aspect, or to perform any possible implementations of the above first aspect or second aspect.

In a ninth aspect, a computer program product is provided. The computer program product includes computer program instructions that enable a computer to perform the method in the above first or second aspect, or to perform any possible implementations of the first aspect.

In a tenth aspect, a computer program is provided. When run on a computer, the computer program enables the computer to perform the method in the above first aspect or any possible implementations of the first aspect.

Based on one of the above technical schemes, the network device can determine, in accordance with the first information, the at least one target parameter information which is invalid or to be deleted, which can avoid the network device scheduling or configuring the terminal device in accordance with a parameter information unexpected by the terminal device.

DETAILED EMBODIMENTS

Hereinafter, technical solutions in the embodiments of the present application will be described with reference to the accompanying drawings. Apparently, the accompanying drawings in the following description are merely some embodiments of the present disclosure. To those of ordinary skills in the art, other accompanying drawings may also be derived from these accompanying drawings without any creative efforts.

Figure 1:
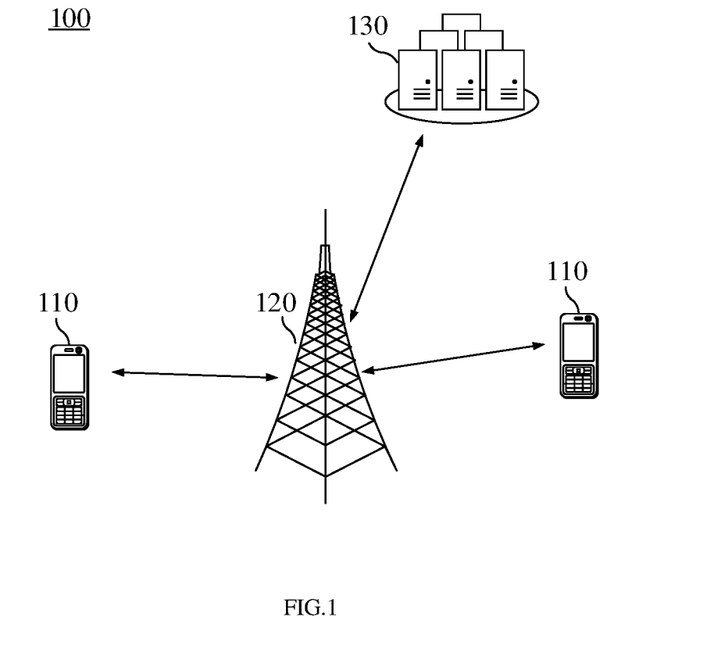
FIG. 1 is a schematic architecture diagram of an application scenario according to an embodiment of the present application.

FIG. 1 is a schematic architecture diagram of an application scenario according to an embodiment of the present application.

As shown in FIG. 1, a communication system 100 may include a terminal device 110 and a network device 120. The network device 120 may communicate with the terminal device 110 via an air interface. Multi-service transmission is supported between the terminal device 110 and the network device 120.

It can be understood that, embodiments of the present disclosure are only illustrated by taking communication system 100 as an example, but are not limited thereto. That is to say, the technical solution of the embodiments of the present disclosure may be applied to various scenarios, such as a Long Term Evolution (LTE) system, a LTE Time Division Duplex (TDD), a Universal Mobile Telecommunication System (UMTS), a 5G communication system (also referred as the New Radio communication system) or a future communication system, etc.

In the communication system 100 shown in FIG. 1, the network device 120 may be a access network device that can communicate with a terminal device 110. The network device 120 can provide a communication coverage for a particular geographic area and can communicate with the terminal devices 110 (e.g., a UE) located within the coverage area.

The network device 120 may be an evolutional base station (Evolutional Node B, eNB or eNodeB) in the Long Term Evolution (LTE) system, or a base station in a Next Generation Radio Access Network (NG RAN), or a base station (gNB) in the NR system, or a wireless controller in a Cloud Radio Access Network (CRAN). Alternatively, the network device 120 may be a relay station, an access point, a vehicle-mounted device, a wearable device, a hub, a switch, a bridge, a router, or a network device in a future evolutional Public Land Mobile Network (PLMN), etc.

The terminal device 110 may be any terminal device including but not limited to one that can communicate with a network device 120 or other terminal device in a wireless or wired communication manner.

For examples, the terminal device 110 may be referred to as an access terminal, a user equipment (UE), a subscriber unit, a subscriber station, a mobile station, a station, a remote station, a remote terminal, a mobile device, a user terminal, a terminal, a wireless communication device, a user agent or a user apparatus. For example, it may be a cellular phone, a cordless phone, a session initiation protocol (SIP) phone, a wireless local loop (WLL) station, a personal digital assistant (PDA), a handheld device with wireless communication capability, a computing device or other processing devices connected to a wireless modem, a vehicle-mounted device, a wearable device, a terminal device in 5G communication system or a future evolutional system and etc.

The terminal device 110 may be applied to a device-to-device communication system.

The wireless communication system 100 may further includes a core network device 130 that communicates with a base station. Optionally, the core network device 130 may be a 5G core network device, for example, an Access and Mobility Management Function (AMF), for another example, a Session Management Function (SMF). Optionally, the core network device 130 may also be an Evolved Packet Core (EPC) device of the LTE network, for example, a Session Management Function+Core Packet Gateway (SMF+PGW-C) device. It can be understood that SMF+PGW-C may realize the functions which can be realized by the SMF and the PGW-C at the same time. During the evolutional process of the core network, the core network devices above may be named else or some new network entities may be formed by dividing the functions of the core network. The names of the core network devices or the new network entities of the core network are not limited herein.

Optionally, each functional unit in the communication system 100 may establish a connection through a next generation network (NG) interface to implement communication.

Figure 2:
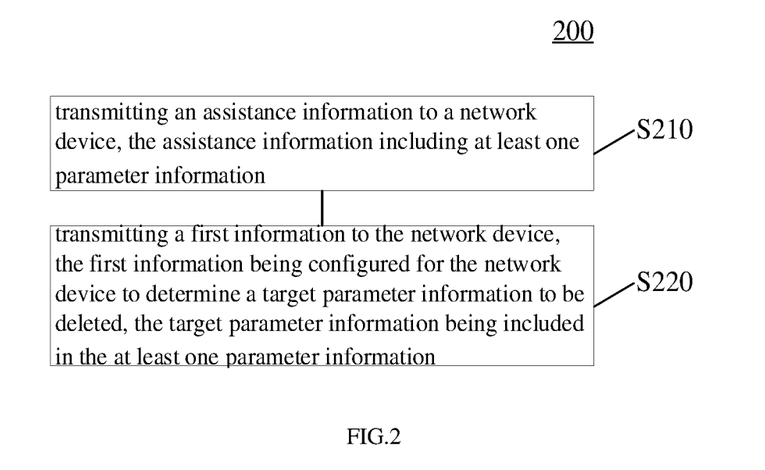
FIG. 2 is a schematic flowchart of a wireless communication method according to an embodiment of the present application.

For example, the terminal device establishes an air interface connection with an access network device through an NR interface for transmitting user plane data and control plane signaling; the terminal device may establish a control plane signaling connection with the AMF through an NG interface 1 (referred to as N1); the access network device, such as a next-generation wireless access base station (gNB), can establish a user plane data connection with the UPF through NG interface 3 (referred to as N3); the access network device can establish control plane signaling connection with AMF through NG interface 2 (referred to as N2); UPF can establish control plane signaling connection with SMF through NG interface 4 (referred to as N4); UPF can exchange user plane data with data network through NG interface 6 (referred to as N6); AMF can establish a control plane signaling connection with SMF through NG interface 11 (referred to as N11); SMF can establish a control plane signaling connection with PCF through NG interface 7 (referred to as N7). It can be noted that the part shown in FIG. 2 is only an exemplary architecture diagram.

FIG. 1 exemplarily illustrates a base station, a core network device, and two terminal devices. Optionally, the wireless communication system 100 may include multiple base station devices and each base station may include other numbers of terminal devices in its coverage area, the embodiments of the present application are not limited thereto.

It can be understood that, any devices with communication functions in a network or system may be referred to as communication devices in embodiments of this disclosure. Taking the communication system 100 shown in FIG. 1 as an example, the communication devices may include a network device 120 and a terminal device both of which have communication functions. The network device 120 and terminal device 110 may be any ones mentioned above and will not be further described for avoiding repetition. The communication devices may include other devices in a communication system 100, such as a network controller, a mobility management entity and etc., which are not limited thereto.

It is to be understood that use of terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

When a demand or state of the terminal device is changed, the terminal device will transmit an information for updating the assistance information, i.e., a new assistance information will be transmitted to the network device. After the network receives the information for updating the assistance information from the terminal device, the assistance information stored in the network device is overwritten by the information for updating the assistance information.

In other words, only if a new assistance information is generated or an assistance information is changed, the terminal device will report the new assistance information or the changed assistance information to the network device, that is, the network device can delete the stored assistance information only by overwriting the stored assistance information, which is not flexible for the network device to use the assistance information.

Consequently, a technical scheme that can be flexible for a network device to use an assistance information is urgently needed in this technical field.

When a demand or state of the terminal device is changed, the terminal device will transmit an information for updating the assistance information, i.e., a new assistance information will be transmitted to the network device. After the network receives the information for updating the assistance information from the terminal device, the assistance information stored in the network device is overwritten by the information for updating the assistance information.

In other words, only if a new assistance information is generated or an assistance information is changed, the terminal device will report the new assistance information or the changed assistance information to the network device, that is, the network device can delete the stored assistance information only by overwriting the stored assistance information, which is not flexible for the network device to use the assistance information.

Consequently, a technical scheme that can be flexible for a network device to use an assistance information is urgently needed in this technical field.

FIG. 2 is a schematic flowchart of a wireless communication method 200 according to an embodiment of the present application, the method may be performed by a terminal device.

Referring to FIG. 2, the method includes parts or whole of the following: S210, transmitting an assistance information to a network device, the assistance information including at least one parameter information; and S220, transmitting a first information to the network device, the first information configured for the network device to determine a target parameter information to be deleted, the target parameter information included in the at least one parameter information. That is, in accordance with a first information, the network device may determine a target parameter information which is invalid or to be deleted, which may avoid the network device scheduling or configuring the terminal device in accordance with a parameter information that is not expected by the terminal device, which facilitates the network device to use a parameter information included in the assistance information flexibly. After deletion of the target parameter, the wireless communication method 200 can cause the network device to not include the target parameter information in scheduling or configuring the terminal device.

Optionally, the terminal device transmits to the network device a configuration information recommended by the terminal device, and then the network device can configure the terminal device reasonably. Optionally, the configuration information may include a DRX (Discontinuous Reception) cycle that the terminal device recommends for the network device to configure for the terminal device itself.

Optionally, the terminal device may transmit a request information to the network device, and then the network device may schedule the terminal device in accordance with the request information recommended by the terminal device. Optionally, the request information may be a connection-releasing request information.

Optionally, the assistance information may be any recommended parameter information for saving power of the terminal device.

Taking the target parameter information being a RDX cycle as an example, the terminal device is configured by the network device to be DRX ON at a moment that may be foreknown by the network device. When in DRX on, the terminal device monitors a downlink control channel Meanwhile, the terminal device may also be configured by the network device to go sleep (DRX off) at a moment that may be foreknown by the network device. When in DRX OFF, the terminal device doesn't monitor a downlink control channel.

If the network device has some data to be transmitted to the terminal device, the network device may schedule the terminal device when the terminal device is in DRX ON state. Since radio frequency of the terminal device may be turned off when the terminal device is in DRX OFF state, power consumption of the terminal can be reduced.

According to the embodiment, DRX cycle parameters that can be supported by the terminal device may include at least one DRX cycle parameter, and the terminal device may transmit to the network device a suggested DRX cycle parameter that is included in the assistance information, which is convenient for the network device to configure the target DRX cycle. The terminal device may transmit to the network device a first information, in accordance with which the network device determines whether to continue referring to or to change the target DRX.

Optionally, the assistance information may include one or more of the following parameters:
  a DRX parameter;
  an overheating information;
  a connection-releasing request;
  a maximum number of MIMO layers recommended by the terminal device; and an operating bandwidth recommended by the terminal device.

Optionally, the at least one parameter information may include one or more of the following information:
- a DRX parameter;
- an overheating information;
- a connection-releasing request;
- a maximum number of MIMO layers recommended by the terminal device; and
- an operating bandwidth recommended by the terminal device.

The DRX parameter may include at least one timer related to the DRX.

The DRX parameter may include a multiple number of DRX parameters corresponding to different DRX cycles. Optionally, the DRX parameter may include a long DRX cycle and/or a short DRX cycle. The long DRX cycle is larger than the short DRX cycle. Optionally, the DRX parameter may include a drx-LongCycleStartOffset which is used to configure a long DRX cycle, an subframe offsets at the start of a long DRX cycle and a short DRX cycle.

Optionally, the DRX parameter may include one or more of the following timers:
- a drx-onDuration timer which means a duration during which a terminal device is DRX ON as of the beginning of a DRX Cycle, in this scenario, the DRX parameter may include a drx-SlotOffset, which means a delay for a terminal device to start a DRX-onDuration timer;
- a drx-ShortCycleTimer, which means a duration during which a terminal device is in a short DRX cycle and receiving no PDCCH;
- a drx-Inactivity timer, which means a duration during which a terminal device continues monitoring a PDCCH after the terminal device receives a PDCCH indicating an uplink or down initial transmission;
- a drx-RetransmissionTimerDL, which means a maximum duration during which a terminal device is monitoring a PDCCH indicating a downlink repetition scheduling; Each downlink HARQ process other than a broadcast HARQ process corresponds to a drx-RetransmissionTimerDL;
- a drx-RetransmissionTimerUL, which means a maximum duration during which a terminal device is monitoring a PDCCH indicating an uplink repetition scheduling; Each uplink HARQ process corresponds to a drx-RetransmissionTimerUL;
- a drx-HARQ-RTT-TimerDL (DRX Hybrid Automatic Repeat Request Round Trip Time Downlink Timer), which means a minimum waiting time required for a terminal device to expect to receive a PDCCH indicating downlink scheduling. Each downlink HARQ process other than the broadcast HARQ process corresponds to a drx-HARQ-RTT-TimerDL; and
- a drx-HARQ-RTT-TimerUL (DRX Hybrid Automatic Repeat Request Round Trip Time Uplink Timer), which means a minimum waiting time required for a terminal device to expect to receive a PDCCH indicating uplink scheduling. Each uplink HARQ process other than a broadcast HARQ process corresponds to a drx-HARQ-RTT-TimerUL.

The terminal can monitor a PDCCH in DRX Active Time. The DRX Active Time may include any time in which any one of the drx-onDurationTimer, drx-InactivityTimer, drx-RetransmissionTimerDL, and drx-RetransmissionTimerUL is running. That is, a network device may transmit a PDCCH to a terminal device in DRX Active Time.

It is noted that, parameters or types of the assistance information mentioned above are just examples, and can't be taken as limitations to the disclosure.

Optionally, the connection-releasing request may denote a request for leaving a connection state. The connection-releasing request may denote an expectation of entering an idle state or an inactive state.

Optionally, the assistance may include a parameter related to CA (carrier aggregation).

Some implementations of the first information will be described below.

In some embodiments of the disclosure, the first information is configured to indicate the target parameter information.

That is, the terminal device transmits the first information to the network device after successfully transmitting the assistance information to the network device.

As an example, the terminal device transmits to the network device an indication configured for instructing the network device to delete the suggested parameter information after determining the target parameter information included in the at least one parameter information.

That is, after the terminal device transmits the assistance information to the network device, the terminal device determines that a target parameter information included in the at least one parameter information is invalid, or determines that a target parameter information is expected to be withdrawn or deleted, and then the terminal device transmits to the network an indication configured for the network device to delete the target parameter information after determining the target parameter information included in the at least one parameter information.

As an example, the terminal device is configured to determine an overtime target timer included in at least one timer, wherein at least one parameter information corresponds to the at least one timer, and the terminal device determines a parameter information corresponding to the overtime target timer as the target parameter information. That is, the terminal device starts the at least one timer after successfully transmitting the assistance information, and then the terminal device is configured to determine an overtime target timer included in at least one timer, wherein at least one parameter information corresponds to the at least one timer, and the terminal device determines a parameter information corresponding to the overtime target timer as the target parameter information.

Optionally, the terminal device is configured to transmit an information for updating the assistance information. Similarly, after the terminal device transmits an information for updating the assistance information successfully, a timer corresponding to a parameter information included in the information for updating the assistance information is started.

As an example, the terminal device determines the at least one parameter information as the target parameter information.

Optionally, the first information may be configured as an indication for the network device to delete the assistance information.

As an example, the at least one parameter information corresponds to a timer, and after the timer is overtime, the first information is transmitted to the network.

As another example, if a preset condition is satisfied, the terminal device is configured to transmit the first information to the network device.

In some other embodiments of the disclosure, the assistance information includes the first information. The first information is configured to indicate a valid duration of each of the at least one parameter information or configured for the network device to determine a valid duration of each of the at least one parameter information.

Optionally, in accordance with the first information, the network device may determine a valid duration of each parameter information included in the assistance information, and then the network device may delete a parameter information which is beyond the valid duration as of the reception of the assistance information.

For example, the first information includes at least one timer corresponding to the at least one parameter information.

That is, after the network device receives the assistance information, as per the at least one parameter information, the network device is configured to start the at least one timer corresponding to the at least one parameter information, and then the network device may delete a parameter information corresponding to an overtime timer.

For example, the at least one parameter information is one-to-one corresponding to the at least one timer.

That is, the assistance information may include timers respectively corresponding to each of the at least one parameter information.

As another example, the at least one parameter information is multiple numbers of parameter information, one or more of the multiple numbers of parameter information corresponds one of the at least one timer.

That is, the at least one parameter information included in the assistance information may be divided into at least one group of parameter information. The at least one group of parameter information may correspond to the at least one timer by one-to-one, i.e., each group of the at least one group of parameter information may correspond to a same one timer.

Optionally, each group of the at least one group of parameter information may include a same type of parameter information. Optionally, various parameter information included in the DRX parameter information may correspond to one timer, i.e., the various parameter information included in the DRX parameter information may be arranged into a same group.

In some embodiments of the disclosure, the terminal device may transmit an information for updating the assistance information to the network device.

The alternative embodiments of the disclosure are specifically described above by referring to the drawings. But the disclosure is not limited to concrete details of the above embodiments. Any variations that can be obtained by those skilled in the art within the technical scope disclosed by the disclosure shall fall within the scope of protection of the disclosure.

For example, the various specific technical features described in the foregoing specific embodiments can be combined in any suitable manner if there is no contradiction. In order to avoid unnecessary repetition, the present application does not explain various possible combinations separately.

As another example, various different embodiments of the present application can also be combined arbitrarily, as long as it does not violate the idea of the present application, and such combination can also be regarded as the contents disclosed in the present application.

It can be understood that, in the various method embodiments of the present application, the size of the sequence number of each process mentioned above does not mean the order of execution. The execution order of each process can be determined by its function and internal logic, and can not constitute any limitation on the implementation process of the embodiments of the present application.

A wireless communication method according to the embodiment of the present application is described in detail above with reference to FIG. 2 from the perspective of the terminal device. A wireless communication method according to an embodiment of the present application will be described below in conjunction with FIG. 3 from the perspective of a network device.

Figure 3:
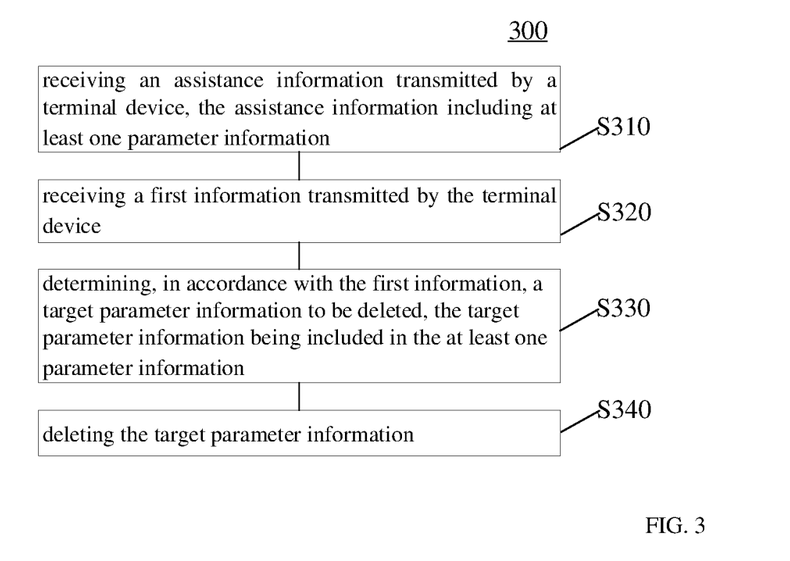
FIG. 3 is a schematic flowchart of a wireless communication method according to the embodiment shown in FIG. 2.

A schematic flowchart of a wireless communication method 300 according to the embodiment of the present application is illustrated in FIG. 3. The method 300 may be performed by a network device as shown in FIG. 1.

As shown in FIG. 3, the method includes the following steps:

S310, receiving an assistance information transmitted by a terminal device, the assistance information including at least one parameter information;

S320, receiving a first information transmitted by the terminal device;

S330, determining, in accordance with the first information, a target parameter information to be deleted, the target parameter information included in the at least one parameter information;

S340, deleting the target parameter information.

Optionally, after a network device receives an assistance information transmitted by a terminal device, the network device may determine, in accordance with the first information, a target parameter information to be deleted. The target parameter information is included in the assistance information, and then the network device deletes the target parameter information.

In some embodiments of the present disclosure, the first information is configured to indicate the target parameter information.

That is, the terminal device uses the first information to show the target parameter information to the network device.

In some embodiments of the present disclosure, the target parameter information is a part or all of the at least one parameter information.

In some embodiments of the present disclosure, the network device receives a first information transmitted by the terminal device after successfully receiving the assistance information.

In some embodiments of the present disclosure, the assistance information includes the first information. The first information is configured to indicate a valid duration of each of the at least one parameter information or configured for the network device to determine a valid duration of each of the at least one parameter information.

That is, the network device may determine, in accordance with the first information, a valid duration of each parameter information included in the assistance information, and then the network device may delete a parameter information which is beyond the valid duration as of the reception of the assistance information.

In some embodiments of the present disclosure, the first information includes at least one timer corresponding to the at least one parameter information.

In some embodiments of the present disclosure, the at least one parameter information is one-to-one corresponding to the at least one timer.

In some embodiments of the present disclosure, the at least one parameter information is multiple numbers of parameter information, one or more of the multiple numbers of parameter information corresponds one of the at least one timer.

In some embodiments of the present disclosure, the network device may determine a target parameter information included in the at least one parameter information in accordance with the at least one timer.

In some embodiments of the present disclosure, the network device may determine an overtime target timer included in the at least one timer, and then determine a parameter information corresponding to the overtime target timer as the target parameter information.

In some embodiments of the present disclosure, the network device starts the at least one timer after successfully receiving the assistance information transmitted by the terminal device.

In some embodiments of the present disclosure, after successfully receiving an information for updating the assistance information, the network device starts or restarts a timer corresponding to a parameter information included in the information for updating the assistance information.

In some embodiments of the present disclosure, the network device receives an information for updating the assistance information.

In some embodiments of the present disclosure, the assistance information includes one or more of the following parameters:
  a DRX parameter;
  an overheating information;
  a connection-releasing request;
  a maximum number of MIMO layers recommended by the terminal device; and
  an operating bandwidth recommended by the terminal device.

In some embodiments of the present disclosure, the DRX parameter includes a multiple number of DRX parameters corresponding to different DRX cycles.

FIGS. 1-3 are schematic flowcharts of a method according to an embodiment of the present disclosure, and a device will be described below by referring to FIGS. 4-7.

Figures 4, 5:
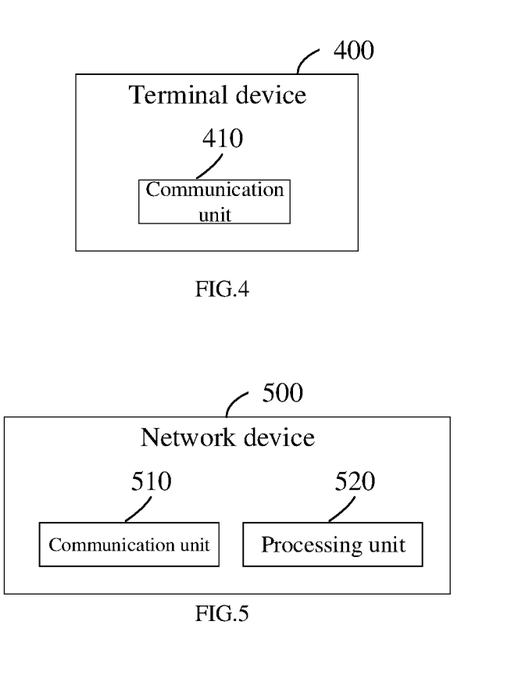
FIG. 4 is a schematic structural diagram of a terminal device according to an embodiment of the present application.
FIG. 5 is a schematic structural diagram of a network device according to an embodiment of the present application.

FIG. 4 is a schematic structural diagram of a terminal device 400 according to an embodiment of the present disclosure.

As shown in FIG. 4, the terminal device 400 includes:
  a communication unit 410 configured to:
  transmit an assistance information to a network device, the assistance information including at least one parameter information, and transmit a first information to the network device, the first information configured for the network device to determine a target information to be deleted, the target parameter information included in the at least one parameter information.

In some embodiments of the present disclosure, the first information is configured to indicate the target parameter information.

In some embodiments of the present disclosure, the communication unit 400 is configured to transmit the first information to the network device after successfully transmitting the assistance information.

In some embodiments of the present disclosure, the terminal device further includes a processing unit configured to determine the target information included in the at least one parameter information.

In some embodiments of the present disclosure, the processing unit is configured to:

determine an overtime target timer included in the at least one timer, wherein at least one parameter information corresponds to the at least one timer; and determine a parameter information corresponding to the overtime target timer as the target parameter information.

In some embodiments of the present disclosure, the processing unit is configured to:
  start the at least one timer after successfully transmitting the assistance information.

In some embodiments of the present disclosure, the processing unit is configured to:
  start a timer corresponding to a parameter information included in the information for updating the assistance information after successfully transmitting the information for updating the assistance information.

In some embodiments of the present disclosure, the processing unit is configured to:
  determine the at least one parameter information as the target information.

In some embodiments of the present disclosure, the assistance information includes the first information, the first information is configured to indicate a valid duration of each of the at least one parameter information or configured for the network device to determine a valid duration of each of the at least one parameter information.

In some embodiments of the present disclosure, the first information includes at least one timer corresponding to the at least one parameter information.

In some embodiments of the present disclosure, the at least one parameter information is one-to-one corresponding to the at least one timer.

In some embodiments of the present disclosure, the at least one parameter information is multiple numbers of parameter information, one or more of the multiple numbers of parameter information corresponds one of the at least one timer.

In some embodiments of the present disclosure, the communication unit 410 is configured to:
  transmit an information for updating the assistance information to the network device.

In some embodiments of the present disclosure, the assistance information includes one or more of the following parameters:
  a DRX parameter;
  an overheating information;
  a connection-releasing request;
  a maximum number of MIMO layers recommended by the terminal device; and
  an operating bandwidth recommended by the terminal device.

It can be understood that the device embodiments and the method embodiments may correspond to each other, and similar descriptions may refer to the method embodiments. Specifically, a terminal device 400 shown in FIG. 4 may correspond to a corresponding subject in the method 200 that performs the embodiments of the present application, and the foregoing and other operations and/or functions of each unit in the terminal device 400 are to implement the corresponding process in each method of FIG. 2 respectively. For brevity, details are not described herein again.

FIG. 5 is a schematic structural diagram of a network device according to an embodiment of the present application.

As shown in FIG. 5, the network device 500 includes:
  a communication unit 510, configured to receive an assistance information transmitted by a terminal device, the assistance information including at least one parameter information, and configured to receive a first information transmitted by the terminal device; and a processing unit 520, configured to determine a target parameter information to be deleted, the target parameter information included in the at least one parameter information in accordance with the first information, and configured to delete the target parameter information.

In some embodiments of the present disclosure, the first information is configured to indicate the target parameter information.

In some embodiments of the present disclosure, the target parameter information is a part or all of the at least one parameter information.

In some embodiments of the present disclosure, the communication unit 510 is configured to:

receive a first information transmitted by the terminal device after successfully receiving the assistance information.

In some embodiments of the present disclosure, the assistance information includes the first information, the first information is configured to indicate a valid duration of each of the at least one parameter information or configured for the network device to determine a valid duration of each of the at least one parameter information.

In some embodiments of the present disclosure, the first information includes at least one timer corresponding to the at least one parameter information.

In some embodiments of the present disclosure, the at least one parameter information is one-to-one corresponding to the at least one timer.

In some embodiments of the present disclosure, the at least one parameter information can be a multiple number of parameter information, one or more of the at least one parameter information corresponds to one of the at least one timer.

In some embodiments of the present disclosure, the processing unit 520 is configured to:

determine the target parameter information included in the at least one parameter information in accordance with the at least one timer.

In some embodiments of the present disclosure, the processing unit 520 is configured to:

determine an overtime target timer included in the at least one timer; and determine a parameter information corresponding to the overtime target timer as the target parameter information.

In some embodiments of the present disclosure, the processing unit 520 is configured to:

start the at least one timer after successfully receiving the assistance information transmitted by the terminal device.

In some embodiments of the present disclosure, the processing unit 520 is configured to:

after successfully receiving an information for updating the assistance information, start or restart a timer corresponding to a parameter information included in the information for updating the assistance information.

In some embodiments of the present disclosure, the communication unit 510 is configured to:

receive an information for updating the assistance information transmitted by the terminal device.

In some embodiments of the present disclosure, the assistance information includes one or more of the following parameters:

a DRX parameter;
an overheating information;
a connection-releasing request;
a maximum number of MIMO layers recommended by the terminal device; and
an operating bandwidth recommended by the terminal device.

In some embodiments of the present disclosure, the DRX parameter includes a multiple number of DRX parameters corresponding to different DRX cycles.

It can be understood that the device embodiments and the method embodiments may correspond to each other, and similar descriptions may refer to the method embodiments. Specifically, a network device 500 shown in FIG. 5 may correspond to a corresponding subject in the method 300 that performs the embodiments of the present application, and the foregoing and other operations and/or functions of each unit in the network device 500 are to implement the corresponding process in each method of FIG. 3 respectively. For brevity, details are not described herein again.

The communication device of the embodiments of the present application is described above from the perspective of functional modules in conjunction with drawings mentioned above. It can be understood that the functional module can be implemented in the form of hardware, and can also be implemented by instructions in the form of software, or can be implemented by a combination of hardware and software modules.

Specifically, the steps of the method embodiments in the embodiments of the present application can be completed by an integrated logic circuit of the hardware in the processor and/or the instructions in the form of software. The steps of the method disclosed in the embodiments of the present application can be directly embodied as performed and completed by the hardware decoding processor, or performed and completed by the combination of the hardware and software modules in the decoding processor.

Optionally, the software module may be located in a mature storage medium in the art, such as a random access memory, a flash memory, a read-only memory, a programmable read-only memory, an electrically erasable programmable memory, or a register, etc. The storage medium is located in the memory, and the processor reads information in the memory, and completes the steps in the foregoing method embodiments in combination with its hardware.

For example, in the embodiments of the present application, the processing unit and the communication may be implemented by a processor, and a transceiver.

Figure 6:
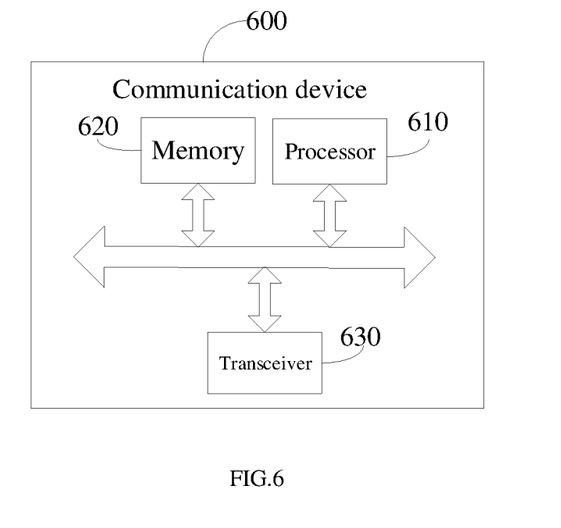
FIG. 6 is a schematic structural diagram of a communication device according to an embodiment of the present application.

FIG. 6 is a schematic structural diagram of a communication device 600 according to an embodiment of the present application. The communication device 600 shown in FIG. 6 includes a processor 610, and the processor 610 can call and run a computer program from a memory to implement the methods in the embodiments of the present application.

Optionally, as shown in FIG. 6, the communication device 600 may further include a memory 620. The memory 620 may be used to store indication information, and may also be used to store codes, instructions or the like performed by the processor 610. The processor 610 may call and run a computer program from the memory 620 to implement the methods in the embodiments of the present application. The memory 620 may be a separate device independent of the processor 610, or may be integrated in the processor 610.

Optionally, as shown in FIG. 6, the communication device 600 may further include a transceiver 630, and the processor 610 may control the transceiver 630 to communicate with other devices, specifically, may send information or data to other devices, or may receive information or data sent by other devices. The transceiver 630 may include a transmitter and a receiver. The transceiver 630 may further include an antenna, and the number of antennas may be one or more.

It can be understood that individual components in the communication device 600 are connected by a bus system, where the bus system includes a power bus, a control bus, and a status signal bus in addition to a data bus.

Optionally, the communication device 600 may be a terminal device in an embodiment of the present application, and the communication device 600 may implement corresponding process implemented by the network device in each method in the embodiments of the present application. That is, the communication device 600 in the embodiments of the present application may correspond to the network device 500 in the embodiments of the present application, and may correspond to a corresponding subject performing the method 200 according to the embodiments of the present application. For brevity, details are not described herein again. Optionally, the communication device 600 may be a network device of an embodiment of the present application, and the communication device 600 may implement the corresponding process implemented by the terminal device in each method of the embodiments of the present application. That is, the communication device 600 may correspond to the network device 500 in the embodiments of the present application, and may correspond to a corresponding subject performing the method 300 according to the embodiments of the present application. For brevity, details are not described herein again.

In addition, an embodiment of the present application also provides a chip, the chip may be an integrated circuit chip with signal processing capability, and may implement or perform the methods, steps, and logical block diagrams disclosed in the embodiments of the present application.

Figure 7:
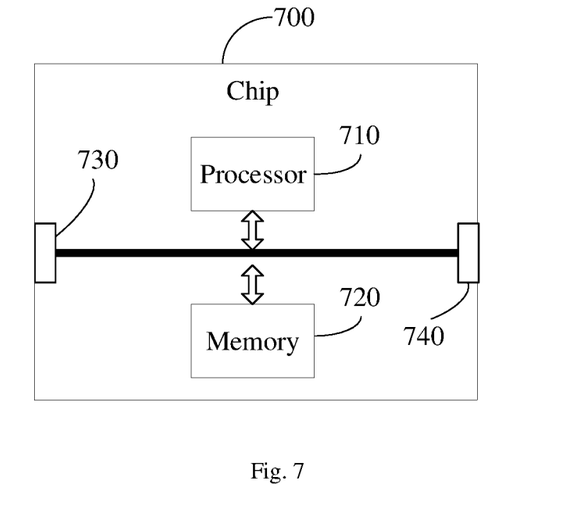
FIG. 7 is a schematic structural diagram of a system chip according to an embodiment of the present application.

FIG. 7 is a schematic structural diagram of a chip according to an embodiment of the present application. The chip 700 shown in FIG. 7 includes a processor 710, and the processor 710 can call and run a computer program from a memory to implement the method in the embodiments of the present application.

FIG. 7 is a schematic structural diagram of a chip of an embodiment of the present application. The chip 700 shown in FIG. 7 includes a processor 710, and the processor 710 may call and run a computer program from the memory to implement the method in the embodiment of the present application.

Optionally, as shown in FIG. 7, the chip 700 may further include a memory 720. The processor 710 may call and run a computer program from the memory 720 to implement the method in the embodiment of the present application. The memory 720 may be a separate device independent of the processor 710, or may be integrated in the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the first device in the embodiment of the present application, and the chip may implement the corresponding process implemented by the first device in various methods of the embodiments of the present application, which are not repeated herein for brevity.

It is noted that, components in the chip 700 are coupled together through a bus system, wherein the bus system includes a data bus, and further includes a power bus, a control bus and a state signal bus.

The above-mentioned processor may be, but not limited to, a general-purpose processor, a Digital Signal Processor (DSP), an Application Specific Integrated Circuit (ASIC), a Field Programmable Gate Array (FPGA), or other programmable logic device, discrete gate, transistor logic device or discrete hardware component.

The general-purpose processor may be a microprocessor or the processor may also be any conventional processor or the like. The steps of the method disclosed in connection with the embodiments of the present application may be directly embodied as being executed and completed by a hardware decoding processor, or executed and completed by a combination of hardware and software modules in the decoding processor. The software module may be located in a mature storage medium in the field such as random access memory, flash memory, read-only memory, programmable read-only memory, electrically erasable programmable memory, register, or the like. The storage medium is located in the memory, and the processor reads the information in the memory and completes the steps of the above method in combination with its hardware.

It may be understood that the memory in the embodiment of the present application may be, but not limited to, a volatile memory or non-volatile memory, or may include both volatile and non-volatile memory. The non-volatile memory may be Read-Only Memory (ROM), Programmable ROM (PROM), Erasable PROM (EPROM), Electrically EPROM (EEPROM) or flash memory. The volatile memory may be Random Access Memory (RAM), which is used as an external cache. By way of exemplary but not restrictive description, many forms of RAM are available, for example, Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It can be noted that the memory of the system and method described herein are intended to include, but are not limited to, these and any other suitable types of memories.

It is noted that the memory in the embodiment of the present application is intended to include, but not limited to, these and any other suitable types of memories.

An embodiment of the present application further provides a computer-readable storage medium for storing a computer program. The computer-readable storage medium includes one or more program, each of which includes computer program instructions that enable a computer to perform implementations of the methods 200 and 300, when the computer program instructions are executed by a portable electronic equipment including multiple application programs.

Optionally, the computer-readable storage medium may be applied to the network device in the embodiment of the application, and the computer program causes the computer to execute the corresponding process implemented by the network device in various methods of the embodiments of the application, which are not repeated herein for brevity.

Optionally, the computer program may be applied to the mobile terminal/terminal device in the embodiments of the present application. When the computer program runs on the computer, the computer executes various the corresponding processes in the methods of the embodiments of the present application implemented by the mobile terminal/terminal device, which will not be repeated herein for briefly.

An embodiment of the present application further provides a computer program product, including computer program instructions.

Optionally, the computer program product may be applied to the network device in the embodiment of the application, and the computer program instructions cause the computer to the corresponding process implemented by the network device in various methods of the embodiments of the present application, which are not repeated herein for brevity.

Optionally, the computer program product may be applied to the mobile terminal/terminal device in the embodiment of the present application, and the computer program instructions cause the computer to execute the corresponding process implemented by the mobile terminal/terminal device in various methods of the embodiments of the present application, which are not repeated herein for brevity.

An embodiment of the present application further provides a computer program. Implementations of the methods 200 and 300 are performed, when the computer program instructions are executed by a portable electronic equipment including multiple application programs.

Optionally, the computer program may be applied to the network device in the embodiment of the present application, and when the computer program runs on the computer, the computer is caused to execute the corresponding process implemented by the network device in various methods of the embodiments of the present application, which are not repeated herein for brevity.

Optionally, the computer program may be applied to the mobile terminal/terminal device in the embodiments of the present application. When the computer program runs on the computer, the computer executes various the corresponding processes in the methods of the embodiments of the present application implemented by the mobile terminal/terminal device, which will not be repeated herein for briefly.

An embodiment of the present application further provides a communication system. As shown in FIG. 1, the communication system may include a terminal device and a network device mentioned above. It can be noted that the terms "system" and the like in this document may also be referred to as "network management architecture" or "network system" and the like.

It can also be understood that the terminology used in the embodiments of the application and the appended claims is for the purpose of describing particular embodiments only and is not intended to limit the embodiments of the application.

For example, the singular forms "a", "the", "the above", and "the" used in the examples of the present application and the appended claims are also intended to include the plural forms unless the context clearly indicates otherwise meaning.

Those skilled in the art may realize that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. Professional technicians can use different methods to implement the described functions for each specific application, but such implementation can't be considered to be beyond the scope of the embodiments of the present application.

If it is implemented in the form of a software functional unit and sold or used as an independent product, it can be stored in a computer-readable storage medium. Based on such an understanding, the technical solution of the embodiments of the present application is essentially a part that contributes to the existing technology or a part of the technical solution may be embodied in the form of a software product, which is stored in a storage medium and includes a plurality of instructions for causing a computer device (which may be a personal computer, a server, a network device, or the like) to perform all or part of the steps of the method described in the embodiments of the present application. The foregoing storage medium includes various medium that can store program codes, such as a U disk, a mobile hard disk, a read-only memory, a random access memory, a magnetic disk, or an optical disk.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it can be understood that the disclosed systems, devices, and methods may be implemented in other ways. For example, the division of units or modules or components in the device embodiments described above is only a logical function division. In actual implementation, there may be another division manner. For example, multiple units or modules or components may be combined or integrated to another system, or some units or modules or components can be ignored or not implemented.

As another example, the above-mentioned units/modules/components described as separate/display components may be or may not be physically separated, that is, they may be located in one place, or may be distributed on multiple network units. Some or all of the units/modules/components can be selected according to actual needs to achieve the objectives of the embodiments of the present application.

Finally, it can be noted that the mutual coupling or direct coupling or communication connection shown or discussed above may be indirect coupling or communication connection through some interfaces, devices or units, which may be electrical, mechanical or other forms.

The above content is only a specific implementation of the embodiments of the present application, without limiting the protection scope of the embodiments of the present application. Any modification or replacement conceived by those skilled in the art within the technical scope disclosed in the embodiments of the present application can be covered within the protection scope of the embodiments of the present application. Therefore, the protection scope of the embodiments of the present application shall be subject to the protection scope of the claims.

What is claimed is:

1. A wireless communication method, comprising:
    transmitting, by a terminal device, an assistance information to a network device, the assistance information including at least one parameter information capable of assisting the network device to schedule or configure the terminal device;
    transmitting, by the terminal device, a first information to the network device, the first information configured for the network device to determine a target parameter information to be deleted, the target parameter information included in the at least one parameter information; and after deletion of the target parameter information, causing the network device to not include the target parameter information in scheduling or configuring the terminal device, wherein the assistance information comprises the first information, the first information is configured to indicate a valid duration of each of the at least one parameter information, or configured for the network device to determine a valid duration of each of the at least one parameter information.

2. The method as claimed in claim 1, wherein the assistance information comprises one or more of the following parameters:
   a DRX (Discontinuous Reception) parameter;
   an overheating information;
   a connection-releasing request;
   a maximum number of MIMO layers recommended by the terminal device; and
   an operating bandwidth recommended by the terminal device.

3. A wireless communication method, comprising:
   receiving, by a network device, an assistance information transmitted by a terminal device, the assistance information including at least one parameter information capable of assisting the network device to schedule or configure the terminal device;
   receiving, by the network device, a first information transmitted by the terminal device;
   determining, by the network device and in accordance with the first information, a target parameter information to be deleted, the target parameter information included in the at least one parameter information; and
   deleting, by the network device, the target parameter information,
   wherein the assistance information comprises the first information, the first information is configured to indicate a valid duration of each of the at least one parameter information or configured for the network device to determine a valid duration of each of the at least one parameter information.

4. The method as claimed in claim 3, comprising:
   receiving, by the network device, an information for updating the assistance information transmitted by the terminal device.

5. The method as claimed in claim 3, wherein the assistance information comprises one or more of the following parameters:
   a DRX (Discontinuous Reception) parameter;
   an overheating information;
   a connection-releasing request;
   a maximum number of MIMO layers recommended by the terminal device; and
   an operating bandwidth recommended by the terminal device.

6. A terminal device comprising a processor, a memory and a transceiver, the transceiver is configured to:
   transmit an assistance information to a network device, the assistance information including at least one parameter information capable of assisting the network device to schedule or configure the terminal device; and
   transmit a first information to the network device, the first information configured for the network device to determine a target information to be deleted, the target parameter information included in the at least one parameter information,
   wherein the assistance information comprises the first information, the first information is configured to indicate a valid duration of each of the at least one parameter information or configured for the network device to determine a valid duration of each of the at least one parameter information.

7. The terminal device as claimed in claim 6, wherein the assistance information comprises one or more of the following parameters:
   a DRX (Discontinuous Reception) parameter;
   an overheating information;
   a connection-releasing request;
   a maximum number of MIMO layers recommended by the terminal device; and
   an operating bandwidth recommended by the terminal device.

8. A network device comprising a processor, a memory and a transceiver, the transceiver is configured to receive an assistance information transmitted by a terminal device, the assistance information including at least one parameter information capable of assisting the network device to schedule or configure the terminal device, and configured to receive a first information transmitted by the terminal device;
   wherein the processor is configured to determine, in accordance with the first information, a target parameter information to be deleted and to delete the target parameter information, the target parameter information included in the at least one parameter information,
   wherein the assistance information comprises the first information, the first information is configured to indicate a valid duration of each of the at least one parameter information or configured for the network device to determine a valid duration of each of the at least one parameter information.

9. The network device as claimed claim 8, wherein the transceiver is configured to receive an information for updating the assistance information transmitted by the terminal device.

* * * * *